United States Patent [19]

Wells

[11] Patent Number: 5,048,790
[45] Date of Patent: Sep. 17, 1991

[54] SELF-MODULATING CONTROL VALVE FOR HIGH-PRESSURE FLUID FLOW

[75] Inventor: Robert A. Wells, Huntington, N.Y.

[73] Assignee: Target Rock Corporation, Farmingdale, N.Y.

[21] Appl. No.: 554,706

[22] Filed: Jul. 18, 1990

[51] Int. Cl.$^5$ .................... F16K 31/383; F16K 31/02
[52] U.S. Cl. ................... 251/30.04; 251/36; 251/44
[58] Field of Search ............ 251/30.02, 30.03, 30.04, 251/36, 44

[56] References Cited

U.S. PATENT DOCUMENTS

| 931,228 | 8/1909 | Schutte | 251/29 |
|---|---|---|---|
| 2,020,833 | 11/1935 | Hansen | 137/139 |
| 2,575,272 | 11/1951 | Harris | 137/144 |
| 2,613,689 | 10/1952 | Clausen et al. | 137/671 |
| 2,665,708 | 1/1954 | Ghormley | 137/493 |
| 2,968,464 | 1/1961 | Olson | 251/30 |
| 3,154,285 | 10/1964 | Houle | 251/30 |
| 3,799,497 | 3/1974 | Zeuner | 251/30 |
| 4,494,726 | 1/1985 | Kumar, et al. | 251/29 |
| 4,699,351 | 10/1987 | Wells | 251/29 |
| 4,746,093 | 5/1988 | Scanderbeg | 251/30.04 |
| 4,799,645 | 1/1989 | Kramer et al. | 251/30.04 |

FOREIGN PATENT DOCUMENTS

| 1130235 | 5/1961 | Fed. Rep. of Germany | 251/38 |
|---|---|---|---|
| 2158321 | 6/1972 | Fed. Rep. of Germany | 251/341 |
| 2835749 | 2/1979 | Fed. Rep. of Germany | 251/30.04 |
| 2737842 | 3/1979 | Fed. Rep. of Germany | . |
| 0593039 | 2/1978 | U.S.S.R. | 251/30.04 |
| 0594386 | 2/1978 | U.S.S.R. | 251/30.04 |

Primary Examiner—Martin P. Schwadron
Assistant Examiner—Kevin L. Lee
Attorney, Agent, or Firm—Hoffman & Baron

[57] ABSTRACT

A self-modulating control valve for high pressure fluids, particularly gas in three interacting pressure chambers are provided in association with the main disc which includes two piston portions of different diameters, one of which operates as a spool valve to meter fluid flow through valving ports to a pressure stabilizing chamber formed in the main disc and also to the outlet side of the valve. Fluid flow to the pressure chamber which includes the large piston portion is through a metering orifice which drops the pressure in combination with unseating the valve, allowing the pressure in the chamber which includes the smaller of the piston portions to contribute the unseating forces for the main disc.

5 Claims, 1 Drawing Sheet

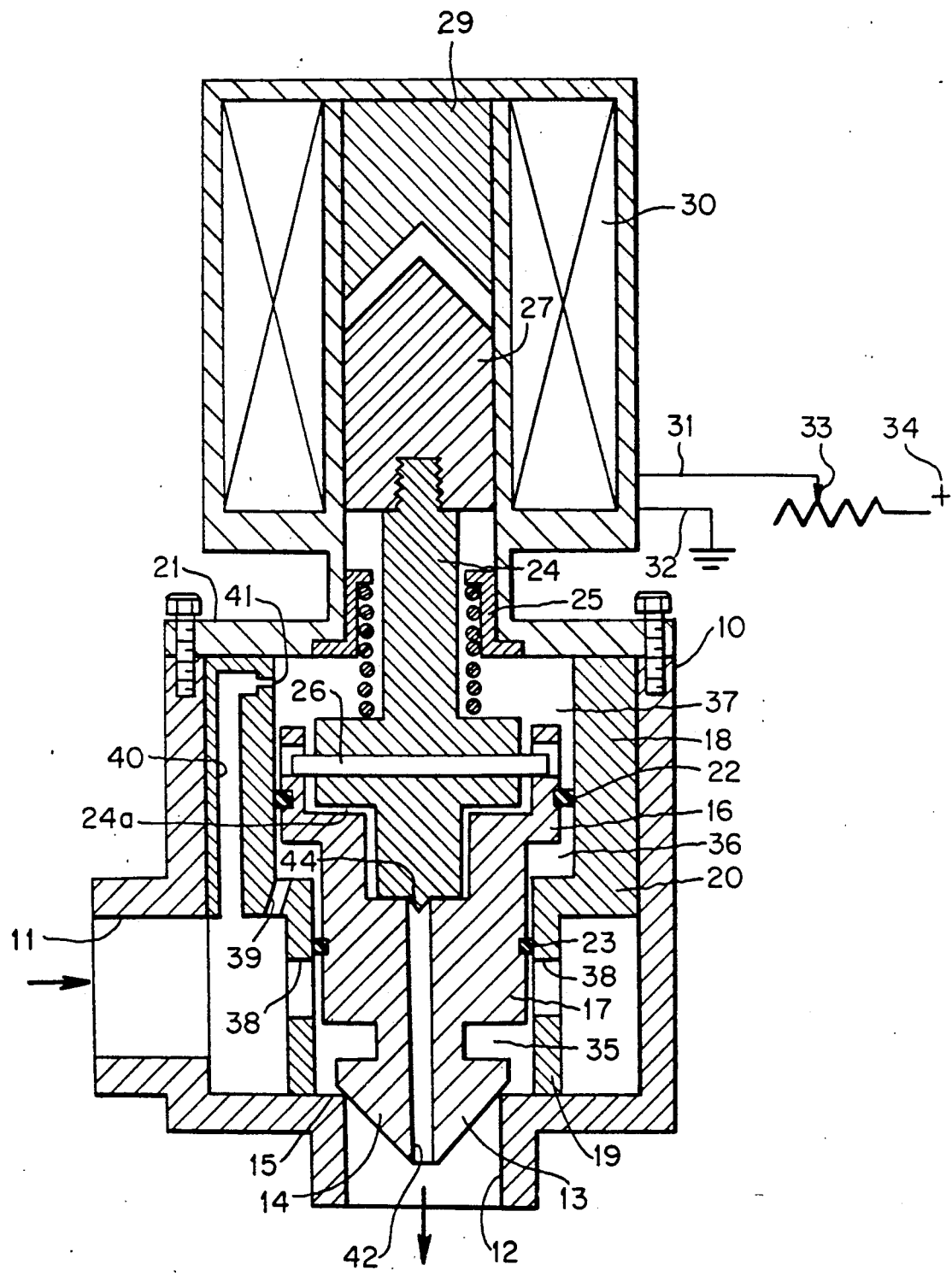

SELF-MODULATING CONTROL VALVE FOR HIGH-PRESSURE FLUID FLOW

This invention relates to control valves for high-pressure fluids and more particularly to proportional solenoid operated valves which are pilot valve actuated and self modulating to provide stability.

BACKGROUND OF THE INVENTION

The applicant's U.S. Pat. No. 4,699,351 discloses a highly stabilized modulating control valve for high pressure fluids which is particularly applicable for fluids such as gas or steam which provide relatively little damping within the valve due to their compressibility. The present invention achieves many of the stabilizing features of the patent utilizing improved designs which are less complicated and expensive to build and which do not sacrifice reliability of operation.

An object of the invention, therefore, is to provide a pressure responsive pilot actuated modulating valve which exhibits stability in operation.

Another object of the invention is to provide a pilot actuated modulating valve particularly useful in the control of high pressure gases, including steam, in which the valve disc is effectively prevented from clashing against its seat in an action known as chattering which is both damaging to the valve elements and disruptive of the flow characteristics.

SUMMARY OF THE INVENTION

There is provided a main disc and pilot valve assembly mounted in a housing having three interacting pressure control chambers. The pilot valve is controlled by a proportional solenoid which is matched to its spring force so that the pilot can be positioned at any point between fully open and fully closed by varying the solenoid coil current. The three chambers are respectively coupled to the inlet pressure of the fluid under control so that in their closed positions, differential pressure forces within the valve provide seating loads to maintain the main valve disc and the pilot valve seated. A lost motion coupling between the pilot valve and the main disc allows movement of the pilot relative to the main disc so that when the solenoid is energized, the pilot valve cracks open to change the relative pressure balances in the chambers allowing the main disc to open, following the movement of the pilot valve by servo action. The proportional solenoid holds the pilot valve in a position fixed in relation to the main disc and the balance of the chamber pressures is such that random changes in pressure occur in a direction to resist undesirable main disc movement.

The main disc operates adjacent its seat as a spool valve which, when cracked open, admits inlet fluid pressure to the third pressure chamber which constitutes a stabilizing chamber formed in the main disc so that as the main disc opens, pressure in that chamber decreases thereby opposing the forces tending to open the valve. For any position, therefore, of the main disc between closed and fully opened a pressure is generated in the third pressure chamber which is proportional to the position of the main disc. Thus, a negative feed back force is generated to provide a strong stabilizing effect acting to prevent chattering or instability of the main disc due to the random effects of the fluid flow through the valve.

BRIEF DESCRIPTION OF THE DRAWING

The drawing is a view in vertical section of a modulating control valve for fluids under pressure embodying the present invention. The drawing is partially diagrammatic and uses enlarged scale, particularly for its fluid passages, in order to illustrate the important features of the invention.

DESCRIPTION OF THE PREFERRED EMBODIMENT

The pilot actuated, proportional solenoid operated control valve includes a valve body lo having a fluid inlet 11 and a fluid outlet 12 between which is disposed the main disc assembly 13, the conical lower end 14 of which engages a seat 15 formed in the housing. The upper portion 16 of the main disc assembly constitutes a large diameter piston and the central portion 17 constitutes a small diameter piston, with the large and small diameter pistons 16 and 17 being received respectively in cylinder portions 18 and 19 formed in a fixed sleeve 20. The sleeve 20 is rigidly clamped in the housing 10 by a bolted cover portion 21. Sealing rings 22 and 23 are fitted respectively between the large and small pistons 16 and 17 and their accommodating cylinders 18 and 19, respectively. A central axial duct 42 is formed in the main valve disc 13, terminating at its upper end in a stepped recess 24a within which is fitted a pilot valve or disc 24 having a tapered valving tip 44 at its lower end seated on the upper end of the axial bore 42 in normally sealing relationship. The pilot disc 24 is urged downwardly against its seat by a compression spring 25 and is coupled to the main disc 13 by a pin 26 having a lost motion coupling to the large diameter piston 16 constituting the upper end of the main disc. The upper end of the pilot disc 24 is coupled to the armature or plunger 27 of a solenoid assembly 28 which includes also a fixed core portion 29 and a coil 30 energized through conductors 31 and 32 through a variable rheostat 33 to a voltage source 34.

In accordance with the invention, three interacting pressure chambers 35, 36 and 37 are formed between the main disc 13 and its mounting sleeve 20. The lower chamber 35 is defined by a recess formed near the lower end of the main disc at the base of the small diameter portion 17. The chamber 35 is normally isolated from the inlet fluid pressure at the inlet 11 by means of ports 38 in the sleeve 20 normally sealed by the small diameter piston 17 of the main disc, which functions therefore as a spool valve to control the flow from the inlet 11 to the chamber 35. The chamber 36 is connected to the inlet pressure by a duct 39 also leading from the inlet port 11. The third chamber, 37, is also connected to the inlet port 11 by a duct 40 and an inlet control pressure-reducing orifice 41.

In operation, when the valve is in its closed position with the main disc 13 and the pilot disc 24 in sealing relationship on their seats 15 and 44, respectively, valve inlet pressure will reach the chambers 35, 36 and 37. Pressure reaches the chamber 35 through the leakage path following the ports 38 and constituted by the clearance between the small piston 17 and the inside cylindrical wall 19 of the sleeve 20. Inlet pressure reaches the chamber 36 directly through the duct 39 and inlet pressure reaches the chamber 37 through the duct 40 and the inlet control orifice 41. It will be understood, therefore, that because of the difference of the diameters of the large and small piston portions, there is a net downward force closing both the pilot and the main disc valves. This net force is opposed only by the relatively small valve outlet pressure acting on the lower faces of the pilot and main discs.

When the solenoid is energized through its variable rheostat, the solenoid plunger 27 will be drawn upwardly to lift the pilot valve 24 off its seat at the upper end of the duct 42. Because the spring 25 is matched to the force of the solenoid, the pilot valve can be positioned at any point between the fully opened and fully closed by varying the solenoid coil current. The lost motion coupling between the pin 26 and the upper end of the main disc allows movement of the pilot relative to the main disc.

As the pilot disc opens, fluid will flow from chamber 37 through the unseated pilot valve at the top of the duct 42 to the valve outlet 12. Because of the relationship of the cross-sectional area of the chamber inlet control orifice 41 to the area of the pilot discharge duct 42, the pressure in the upper chamber 37 will drop in proportion to the amount the pilot disc is opened. When the force or pressure developed in the chamber 37 acting on the large diameter of the piston drops below the combined forces created by the valve inlet pressure in chamber 36 acting on the differential area between the two piston diameters plus inlet pressure in chamber 35 acting on the differential area between the small piston diameter and the main disc diameter plus valve outlet pressure acting on the lower face of the main disc, the main disc will begin to open; the forces acting on the large diameter of the disc exactly balances the other pressure forces acting on the main disc. Since any movement of the main disc relative to the pilot results in a change of pressure in chamber 37, in the direction to resist the main disc movement, its position is held fixed relative to the pilot position by the balance of the pressure forces acting on the main disc.

As stated above, when the main disc is in the closed position, the small diameter 17 of the piston acts as a spool valve closing off the sleeve port 38 which connects the valve inlet pressure with the chamber 35. Leakage past the spool clearance maintains the chamber 35 at a pressure equal to inlet pressure when the main disc is seated. When the main disc opens, however, the sleeve port 38 begin to become uncovered, allowing inlet pressure to flow into the chamber 35 and out through the then cracked open main disc. The relationship of the sleeve port 38 flow area to the flow area between the main disc and its seat is such that the pressure in chamber 35 decreases in proportion to the amount the main disc is open. This decrease in chamber 35 pressure level acting on the differential area between the small diameter of the piston and the main disc seat results in a force tending to oppose the disc opening. When the main disc is moved by servo action toward its closed position, the pressure level in chamber 35 increases tending to oppose the disc closing. This change in chamber 35 pressure due to the movement of the main disc in either direction provides a negative feedback force which provides a strong stabilizing effect acting to prevent chattering or instability of the main disc due to the effects of the fluid flow forces through the various paths created within the valve. In addition, since the piston areas of the main disc are fixed, when the main disc is moved by servo action, the resulting change in the pressure of chamber 35 must be counteracted by a change in pressure in the chamber 37. For example, as the main disc opens and the pressure in chamber 35 decreases, opposing the opening, in order to continue the opening of the main disc, the pilot must be moved slightly away from its seat to reduce the pressure in chamber 37. For any position, therefore, of the main disc between the closed and fully open position, there is a distinct pressure required in chamber 37 that is in proportion to the main disc position. Absent the effect of chamber 35, it will be seen that the main disc would move by servo action, following the pilot valve at a constant pressure level in chamber 37 (assuming constant inlet and outlet pressure levels) which would act to reduce overall valve stability.

While the invention has been described having reference to a preferred embodiment, it should be understood that various modifications in the geometry and ducting of the chambers and the flow paths thereto can be effected to achieve the stabilizing functions as set forth. Also, because the function of the pilot valve and proportional solenoid is to effect a controlled decrease in the pressure in the chamber 37, it will be understood that eliminating the pilot valve 24, its driving solenoid 27, 30 and the ducts 42 and 40 in favor of a variable control pressure source for the chamber 37, the valve can be operated with many of the stabilizing functions described above. Increased pressure in chamber 37 overpowers the forces imparted in the main disc by the pressures in chambers 36 and 35 to close the valve and decreased pressure allows the valve to open to set up the stabilizing force generated by the valve action of the smaller piston 17 relative to the ports 38 and the flow through the main disc portion 14 and its seat 15. It will also be understood that various net pressure profiles can be generated by, for example, shaping the ports 38 and the head 14 of the main disc, all as related to the size of the orifice 41 and the respective effective sizes of pistons. The invention should not, therefore, be regarded as limited except as defined in the following claims.

What is claimed is:

1. A stabilized modulating valve for fluid flow comprising:
   a valve body having inlet and outlet ports;
   a main valve disc and associated seat between the ports to control the fluid flow therebetween;
   said main disc comprising at least two axially spaced piston portions of different diameters in which the portion of smaller diameter is proximate the seat engaging portion;
   first and second cylinder portions furnished in the valve body receiving respectively the smaller and larger piston portions of the main disc in sealing relationship;
   a first pressure chamber defined by the larger piston portion and the valve body acting on the larger piston portion to urge the main disc against its seat;
   a second pressure chamber defined by the smaller piston portion and the larger piston portion to urge the main disc away from its seat,
   a third pressure chamber adjacent the seat engaging portion of the main disc to urge the disc away from its seat, said third chamber being formed in the disc between its seat engaging portion and the smaller piston portion and adapted to be connected to the outlet port when the main disc leaves its seat;
   port means formed in the body forming said first cylinder portion substantially closed by the smaller piston when the main disc is seated, whereby axially motion of the main disc away from its seat displaces the smaller piston to connect the inlet port to both the third pressure chamber and the outlet port through said port means;

second conduit means coupling the inlet port to the second pressure chamber; and adjustable pressure control means to vary the fluid pressure in the first chamber to change the pressure selectively to seat and unseat the main disc.

2. A stabilized modulating valve as set forth in claim 1, said adjustable pressure control means comprising:

a pilot valve assembly and lost motion coupling means joining the pilot valve assembly to the larger piston portion;

a valve seat for the pilot valve in the main disc and third conduit means in the main disc connecting the seat to the outlet port;

variable control means to lift the pilot valve from its seat;

fourth conduit means coupling the inlet port to the first pressure chamber; and flow restricting means in the fourth conduit means to restrict the fluid flow therethrough.

3. A stabilized control valve, as set forth in claim 2, said control means for the pilot valve comprising a proportional electromagnetic solenoid having a driving force matched to the strength of said resilient means to position the pilot valve selectively between fully open and fully closed positions by selectively varying the control current to the solenoid.

4. A stabilized control valve as set forth in claim 2 said piston portions of the main disc comprising concentric axially spaced cylinders.

5. A stabilized control valve as set forth in claim 2 said flow restricting means in the fourth conduit means being sized to decrease the pressure in the first pressure chamber in direct portion to the amount the pilot valve is lifted from its seat in the main valve disc.

* * * * *